Jan. 14, 1969 JAMES E. WEBB 3,422,278
ADMINISTRATOR OF THE NATIONAL AERONAUTICS
AND SPACE ADMINISTRATION
SIGNAL GENERATOR

Filed June 29, 1966 Sheet 1 of 3

INVENTORS
LEONARD A. DEL CASALE
BERNHARD BLUTINGER
BY
ATTORNEYS

INVENTORS
LEONARD A. DELCASALE
BERNHARD BLUTINGER
BY
[signature]
Howard B. Scheckman
ATTORNEYS INVENTORS
LEONARD A. DEL CASALE
BERNHARD BLUTINGER
BY
Howard B. Scheckman
ATTORNEYS

United States Patent Office 3,422,278

Patented Jan. 14, 1969

3,422,278

SIGNAL GENERATOR

James E. Webb, Administrator of the National Aeronautics and Space Administration, with respect to an invention of Leonard A. Del Casale and Bernhard Blutinger, San Diego, Calif.

Filed June 29, 1966, Ser. No. 562,934

U.S. Cl. 307—106 9 Claims

Int. Cl. H03k *3/00*

The invention described herein was made in the performance of work under a NASA contract and is subject to the provisions of section 305 of the National Aeronautics and Space Act of 1958, Public Law 85–568 (72 Stat. 435; 42 USC 2457).

This invention relates to electrical signal generators and, more particularly, to an alternating current signal generator that provides a plurality of amplitude-modualted output signals, the output signals having different types of amplitude modulation.

Signal generators for providing amplitude-modulated alternating current (A.C.) output signals have been known for many years, and are particularly useful for testing electronic systems under both laboratory and field conditions. A disadvantage of such systems has been that they have generally comprised direct current (D.C.) servo control systems. Such D.C. servo systems are particularly susceptible to frequency drifting; hence, such systems have required precision components that are expensive, and sometimes difficult, to procure.

The present invention obviates the foregoing disadvantages by embodying only A.C. control elements. Thus, less precise components may be utilized than in previously known systems, and the frequency drift is considerably improved over prior systems, even though less precise and less expensive components are used.

The present signal generator comprises a rate servo, a resolver, a ramp function generator and a sweep function generator. The rate servo includes an A.C. motor and a tachometer driven by the motor, which serves to maintain the rotational speed of the motor constant in response to an input signal of constant amplitude. The A.C. motor also drives a resolver whose output signal is a constant frequency A.C. signal, which is either amplitude-modulated at a fixed sinusoidal frequency or is amplitude-modulated in accordance with a frequency sweep function.

The ramp function generator, which is also mechanically connected to the A.C. motor in the rate servo, provides a constant carrier frequency A.C. output signal, which is amplitude-modulated in accordance with a ramp or triangular function.

The sweep function generator, which is similarly driven by the A.C. motor, provides a feed-back signal to the motor which causes the resolver to rotate at varying rates of speed to provide a constant carrier frequency output signal, which is amplitude-modulated through a range of modulation frequencies; in other words, the amplitude modulation of the output signal of the resolver is swept through a predetermined modulation frequency range. The range of modulation frequencies is determined by the amplitude of the excitation to the sweep function generator and the time required to sweep through the range is determined by the tap selected on the potentiometer in the sweep function generator.

Additional features and advantages of the invention will be better understood from the following description, taken in conjunction with the accompanying drawings, in which.

Figure 1:
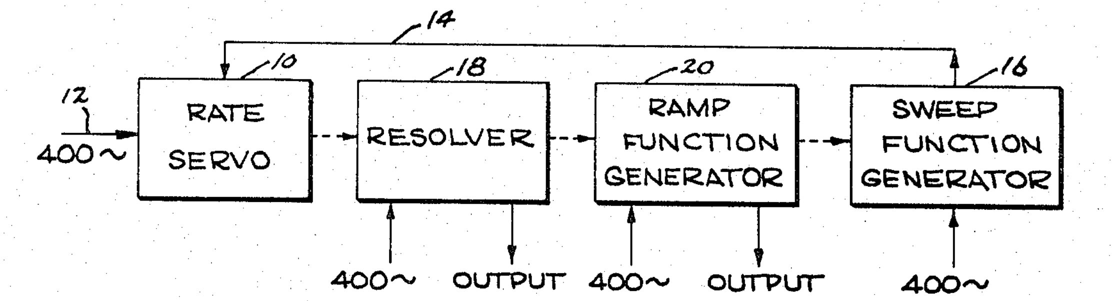
FIGURE 1 is a block diagram of a signal generator embodying the invention.

FIGURE 1 is a block diagram showing the four major components of the function generator of the invention. A rate servo 10 receives a 400 cycle A.C. input signal on a line 12 or a 400 cycle A.C. feedback signal on a line 14 from a sweep function generator 16. The rate servo 10 mechanically drives a conventional A.C. resolver 18, which also receives a 400 cycle input signal. In effect, the resolver 18 comprises a transformer whose primary winding is mechanically fixed and whose secondary winding is rotatable through 360°, so that the secondary winding will provide a fixed frequency sine wave envelope if the secondary winding is rotated at a constant speed. If the secondary winding of the resolver 18 is not rotated at a constant speed, the output of the resolver will be a 400 cycle signal amplitude-modulated at a frequency dependent upon the speed of rotation of the secondary winding.

Figure 2A:
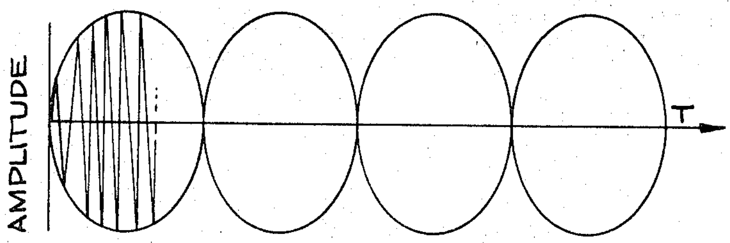
FIGURES 2A, 2B and 2C show wave forms representing available output signals from the signal generator.
Figure 2B:
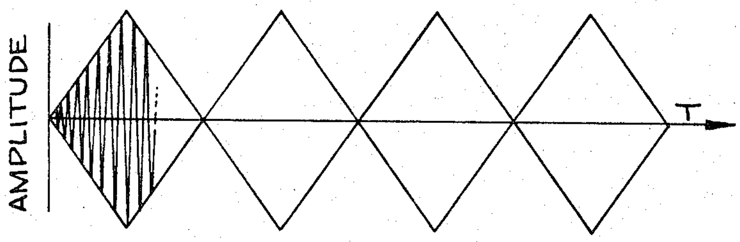
Figure 2C:
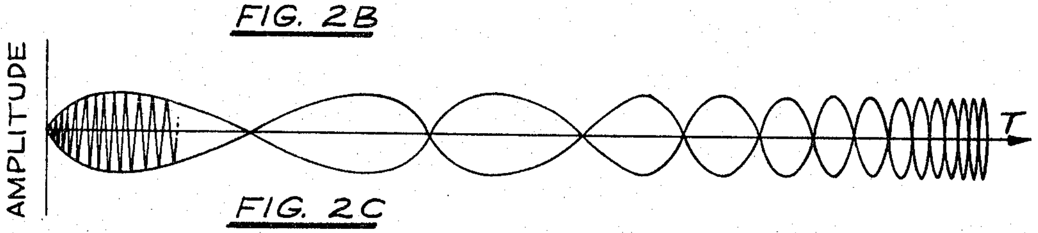

FIGURE 2A represents the output signal of the resolver 18 if its secondary winding is rotated at a constant speed. FIGURE 2C represents the output signal of the resolver if its secondary winding is rotated at increasing speeds, as a result of the feedback signal to the rate servo 10 from the sweep function generator 16.

The rate servo 10 also mechanically drives a ramp function 20. The ramp function generator 20 receives a 400 cycle input signal and provides at its output a 400 cycle signal which is amplitude-modulated in accordance with a ramp or triangular modulation function. FIGURE 2B represents the output signal of the ramp function generator 22, when the input signal to the rate servo 10 is of constant amplitude.

It is pointed out that the modulation frequency of the output signal from the resolver 18 is directly dependent upon the amplitude of the input signal to the rate servo 10, and the amplitude of the modulated output signal from the resolver is dependent upon the amplitude of the 400 cycle input thereto. Similarly, the amplitude of the sweep modulation is dependent upon the amplitude of the 400 cycle input to the resolver 18. The period of the sweep frequency is dependent upon adjustable means in the sweep function generator 16.

The amplitude of modulation of the output signal from the ramp function generator 20 is dependent upon the amplitude of the 400 cycle input signal to the ramp function generator, and the slope of the modulation envelope is dependent upon the amplitude of the 400 cycle input signal on the line 12 to the rate servo 10.

Although the present invention is described in connection with 400 cycle input signals, it is to be clearly understood that the invention is not limited to the use of any particular frequency of input signals. 400 cycle input signals are used merely for illustration because they are generally conveniently available, and are desirable for the testing purposes for which the present instrument was dequencies are desired, the input signal frequencies may be varied correspondingly.

Figure 3A:
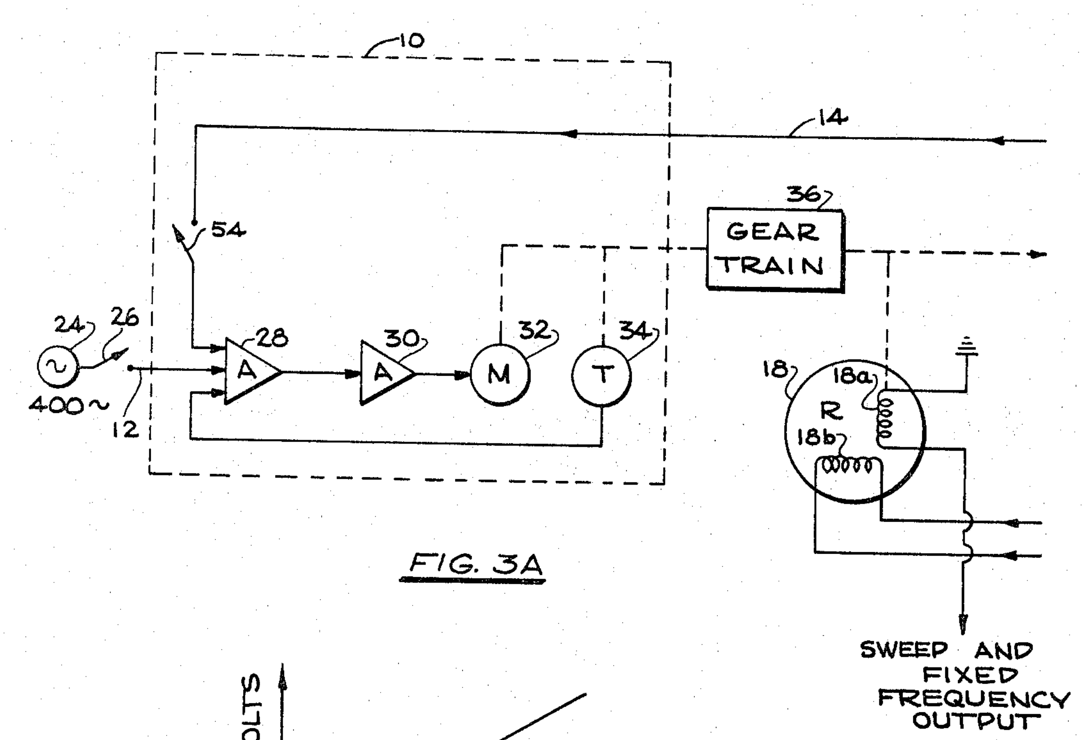
FIGURES 3A and 3B are detailed circuit diagrams of the generator shown in FIGURE 1.
Figure 3B:
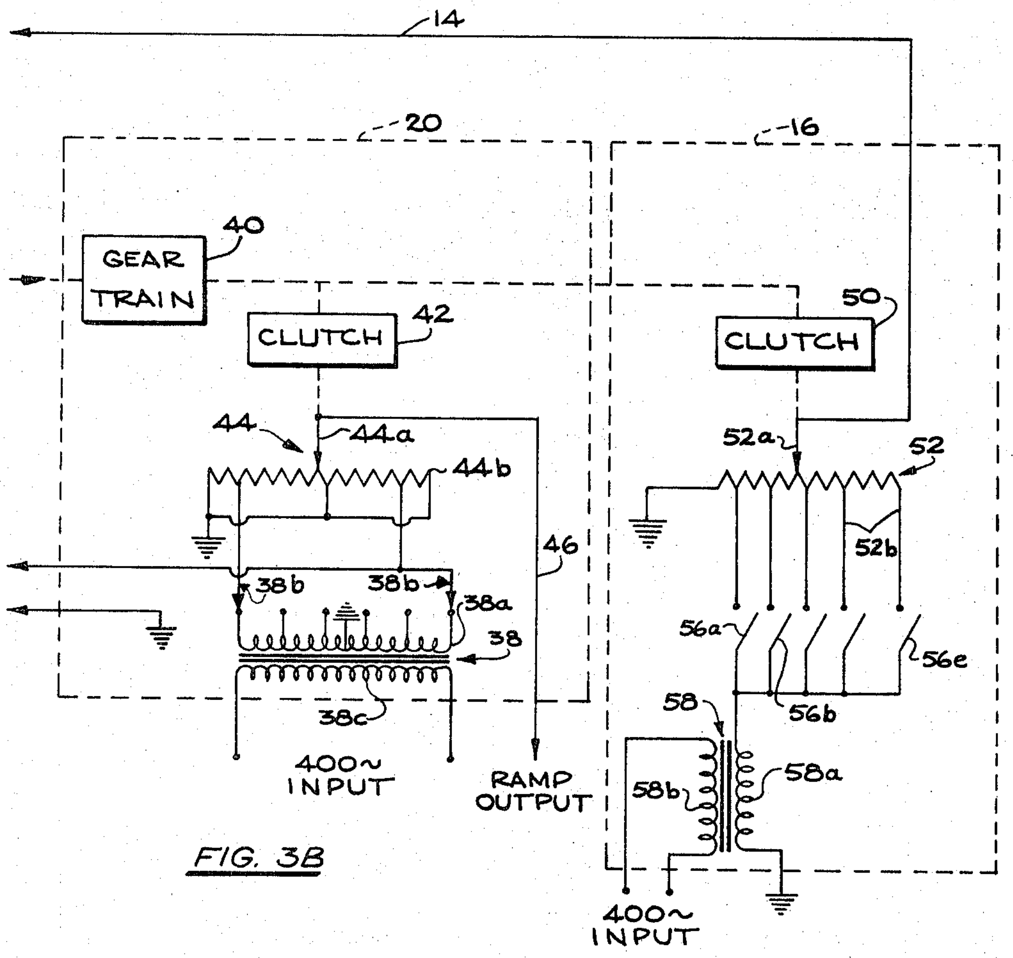

FIGURES 3A and 3B show the signal generator embodying the invention in greater detail than FIGURE 1. As shown in FIGURE 3, a 400 cycle input voltage is provided from a conventional A.C. generator 24 through a switch 26 to the line 12. The input voltage provided from the generator 24 to the rate servo 10 may be of various amplitudes depending upon the modulation frequency desired to be obtained from the fixed frequency output or from the ramp function output of the signal generator. It is noted that the output of the sweep-modulated signal is not affected by the signal from the generator 24.

The line 12 is connected as one input to a conventional summing amplifier 28 in the rate servo 12. The output of the amplifier 28 is connected as an input to a servo amplifier 30. The output of the servo amplifier 30 is connected to drive an A.C. motor 32, whose speed of rotation controls the modulation frequency of the various outputs of the signal generator. The rotor of the motor 32 is mechanically connected to drive a conventional A.C. tachometer 34, whose electrical output is connected to a second input of the amplifier 28. The function of the tachometer 34 is to provide a feed-back voltage to the motor 32 to maintain its speed constant in response to a selected input voltage on the line 12.

The motor 32 is also connected through a conventional gear train 36 to a rotatable secondary winding 18*a* of the resolver 18 previously mentioned. A primary winding 18*b* of the resolver 18 is energized from a transformer 38, which is provided with a 400 cycle input signal from a conventional source (not shown).

Figure 4A:
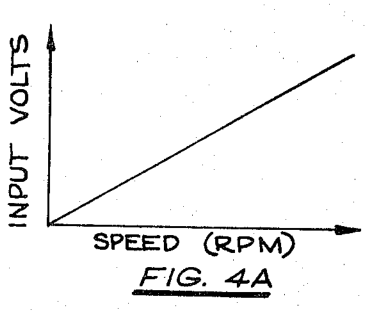
FIGURES 4A, 4B and 4C are wave forms useful in understanding the operation of the generator shown in FIGURES 1 and 3.

The speed of rotation of the motor 32 in response to input signals from the generator 24 on the line 12 is a linear function of the input signal amplitude, as shown in FIGURE 4A. Thus, for a constant value of input signal and constant speed of rotation of the motor 32, the output signal from the secondary winding 18*a* of the resolver 18 will be a 400 cycle signal, amplitude-modulated at a fixed frequency determined by the speed of the motor 32. Such an output signal is shown in FIGURE 2A.

The motor 32 is also mechanically connected to the ramp function generator 20, which includes a gear train 40 connected through a conventional clutch 42 to a linear potentiometer, indicated generally by the numeral 44. The clutch 42 is connected to the rotor 44*a* of the potoentiometer 44, and the linear winding 44*b* of the potentiometer is energized from the secondary winding 38*a* of the transformer 38 by the same signal that energizes the resolver 18. The winding 44*b* of the potentiometer 44 is gorunded at both ends and approximately at its mid-point, and is energized from the transformer 38 at points just short of its two ends.

Figure 4B:
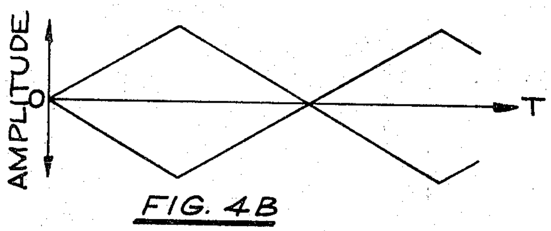

The rotor 44*a* of the potentiometer 44 is connected to a ramp function generator output line 46. As the motor 32 drives the rotor 44*a* of the potentiometer 44, the amplitude of the envelope of the output signal appearing on the line 46 will be approximately triangular, as shown in FIGURE 4B.

The secondary winding 38*a* of the transformer 38 is tapped, as shown generally at 38*b*, to provide 400 cycle signals of various amplitudes to both the potentiometer 44 and to the resolver 18. When a constant amplitude 400 cycle input signal is provided to the primary winding 38*c*, the ramp function generator output signal will be substantially as shown in FIGURE 2B. The amplitudes of the modulated signals obtained from both the fixed frequency output of the resolver 18 and from the ramp frequency output of the generator 20 are determined by the amplitude of the output signal obtained from the taps 38*b* of the transformer 38, and the modulation frequency is controlled by amplitude of the input signal to the rate servo 10 on the line 12 from the generator 24.

In order to provide a sweep frequency output, the motor 32 is also mechanically connected to the sweep function generator 16. The motor 32 is connected through a clutch 50 to the rotor 52*a* of a potentiometer 52 having a plurality of taps 52*b* on its winding. The rotor 52*a* is also electrically connected to the line 14, whose other end is connecteJ through a switch 54 to a third input to the summing amplifier 28 in the rate servo 10.

Figure 4C:
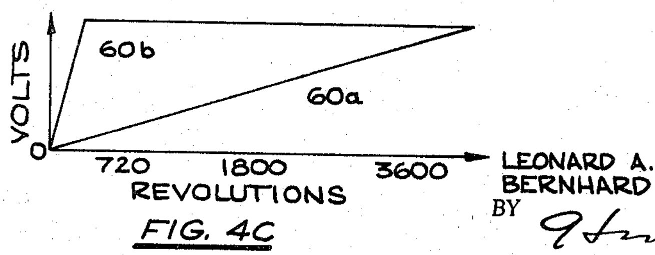

Taps 52*b* are connected through switches 56*a*–56*e* to one end of the secondary winding 58*a* of a transformer 58. The primary winding 58*b* of the transformer is connected to a conventional source (not shown) for providing a 400 cycle input signal to the transformer. Assuming that the input signal to the transformer winding 58*b* is constant in amplitude, closing various ones of the switches 56 will result in varying the time it takes to sweep through a range of amplitude modulation frequencies. For example, if the contact 56*e* is closed, it will take longer to sweep through a given range than if the contact 56a is closed, as shown by the curves 60*a*, and 60*b* shown in FIGURE 4C, respectively. It is pointed out that the switch 26 from the input source 24 should be opened and the switch 54 closed when generating a sweep frequency output signal.

The taps 52*b* on the potentiometer 52 may be varied in position to provide different sweep times to suit particular requirements.

The range of the amplitude-modulation frequencies in a frequency sweep can be varied by changing the output voltage of the transformer 58. For example, if the output voltage of the transformer provides a certain number of modulation frequencies per sweep, the number of frequencies may be reduced by ½ by providing ½ the output voltage from the transformer 58. This is independent of the length of time required to sweep through the sweep range, which is determined by the condition of the switch contacts 56*a*–56*e*.

It is apparent that as the rotor 52*a* of the potentiometer 52 is driven by the motor 32, the voltage fed back to the motor will vary and consequently the speed of the motor will vary. In turn, the rotational speed of the secondary winding 18*a* of the resolver 18 will vary to cause the amplitude-modulation frequency of the output signal of the resolver to vary as shown in FIGURE 2C. If, for example, the contact 56*a* of the switch 56 is closed, and the other contacts are open, the output voltage from the transformer 58 will be fed back to the motor in a very short time. Thus, the output voltage from the resolver 18 will sweep through the predetermined frequency range in a very short time, and then its output will remain constant until the potentiometer rotor 52*a* starts another revolution around the winding of the potentiometer.

It is now apparent that the signal generator of the invention fills a need in the art in that it provides amplitude-modulated fixed carrier frequency output signals, which may be amplitude-modulated in accordance with a sine wave function, a ramp modulation function or a sweep frequency function. Although only a single embodiment of the invention has been shown, it is apparent that many changes and modifications therein may be made by one skilled in the art without departing from the true scope and spirit of the invention.

What is claimed is:

1. A signal generator for providing a plurality of differently amplitude-modulated alternating current output signals, comprising:
   - a rate servo;
   - means for providing an alternating current input signal to drive said rate servo;
   - a resolver mechanically connected to said rate servo for providing a sinusoidally amplitude-modulated output signal whose frequency of modulation is controlled by said rate servo;
   - a ramp function generator mechanically connected to said rate servo for providing an output signal modulated in accordance with a ramp function; and
   - a sweep function generator mechanically connected to said rate servo and electrically connected to said rate servo for causing said resolver to provide an output signal sinusoidally modulated in accordance with a modulation sweep function.

2. The signal generator defined by claim 1, wherein said rate servo includes an alternating current motor and a tachometer mechanically and electrically connected to maintain the speed of said motor constant in response to a substantially constant amplitude signal to said rate servo.

3. The signal generator defined by claim 1, wherein said resolver is energized by a constant amplitude signal applied to a primary winding, and a secondary winding is rotated by said rate servo to provide said sinusoidally amplitude-modulated output signal.

4. The signal generator defined by claim 1, wherein said ramp function generator includes a potentiometer having a winding energized by a constant voltage source, and a rotor mechanically driven by said rate servo, the output signal from said potentiometer being taken from said rotor.

5. The signal generator defined by claim 1, wherein said sweep function generator includes a potentiometer having a winding energized by a constant voltage source, and a rotor mechanically driven by said rate servo, said rotor being electrically connected to said rate servo.

6. The signal generator defined by claim 2, wherein said resolver is energized by a constant amplitude signal applied to a primary winding, and a secondary winding is rotated by said rate servo to provide said sinusoidally amplitude-modulated output signal.

7. The signal generator defined by claim 6, wherein said ramp function generator includes a potentiometer having a winding energized by a constant voltage source, and a rotor mechanically driven by said rate servo, the output signal from said potentiometer being taken from said rotor.

8. The signal generator defined by claim 7, wherein said sweep function generator includes a potentiometer having a winding energized by a constant voltage source, and a rotor mechanically driven by said rate servo, said rotor being electrically connected to said rate servo.

9. The signal generator defined by claim 8, wherein all of the input voltages are of substantially the same frequency.

References Cited

UNITED STATES PATENTS

| | | | |
|---|---|---|---|
| 2,266,105 | 12/1941 | Vogt | 328—181 |
| 3,001,124 | 9/1961 | Johnson | 307—106 |
| 3,241,015 | 3/1966 | Allen | 307—106 |

ROBERT K. SCHAEFER, *Primary Examiner.*

D. SMITH, Jr., *Assistant Examiner.*

U.S. Cl. X.R.

322—41; 328—28